Aug. 13, 1963   B. F. FROEHLICH   3,100,636
TABLE LOCKING CONSTRUCTION FOR A MACHINE TOOL
Filed March 12, 1962

INVENTOR.
BERNARD F. FROEHLICH
BY Pearce & Schaeperklaus

Attorneys

United States Patent Office 3,100,636
Patented Aug. 13, 1963

3,100,636
TABLE LOCKING CONSTRUCTION FOR A MACHINE TOOL
Bernard F. Froehlich, Colerain Township, Hamilton County, Ohio (% Troyke Mfg. Co., 11294 Orchard St., Sharonville, Ohio)
Filed Mar. 12, 1962, Ser. No. 178,859
3 Claims. (Cl. 269—83)

This invention relates to machine tools. More particularly, this invention relates to a table locking construction for a rotary table or the like.

An object of this invention is to provide a position locking structure for a rotary work table or the like which releasably locks the table against turning without tending to turn or rotate the table during locking.

A further object of this invention is to provide a locking structure in which a flange on the work table is gripped by a flange of a locking member having a shank which slides up and down in an upright bore in a base thereof and in which the flange of the locking member is drawn against the flange of the table by a nut threaded on a shank thereof.

A further object of this invention is to provide a locking structure of this type including a locking member which is resiliently biased about the axis thereof and into engagement with a rigid stop to prevent swinging thereof as the lock is operated.

The above and other objects and features of the invention will be apparent to those skilled in the art to which this invention pertains from the following detailed description, and the drawing, in which.

In the following detailed description, and the drawing, like reference characters indicate the parts.

Figure 2:
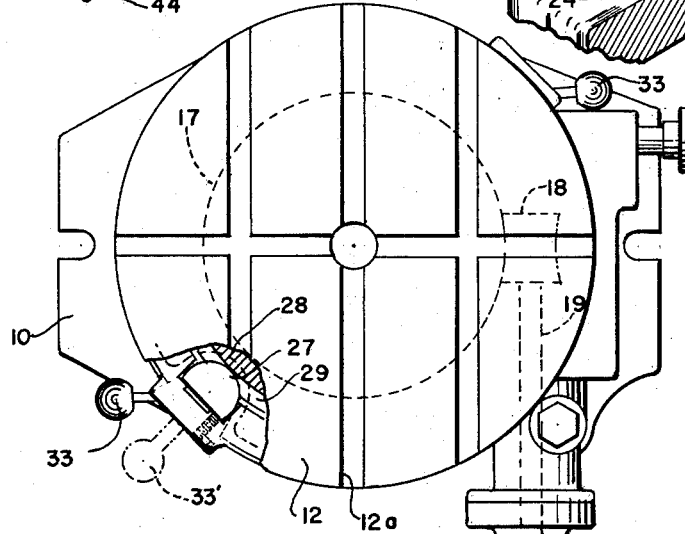
FIG. 2 is a plan view of the work table illustrated in FIG. 1, partly broken away and in section, to reveal details of construction.
Figure 1:
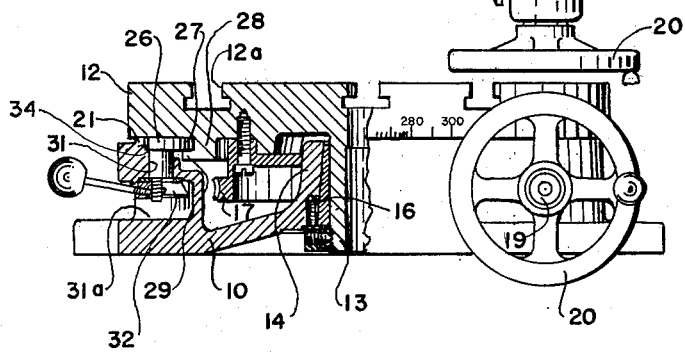
FIG. 1 is a view partly in side elevation and partly in vertical section of a rotary work table including a table locking structure constructed in accordance with an embodiment of this invention.

In FIGS. 1 and 2 is shown a rotary work table which includes a base 10 and a table 12 rotatably mounted thereon. The table 12 is provided with T-slots 12a at which a work piece (not shown) can be attached thereto. A journal collar 13 (FIG. 1) integral with the table 12 is received inside a bearing collar 14 integral with the base, and a bearing sleeve 16 to rotatably mount the table on the base. A worm wheel 17 is attached to the underside of table 12. A worm 18 (FIG. 2), mounted on a shaft 19, turns the table when a handle 20, mounted on the shaft 19, is turned. The table 12 rests on an upwardly extending annular flange 21 (FIGS. 1 and 4) of the base.

When the table 12 has been turned to a selected position, the table is locked in place by a locking assembly which includes a lock member 22. The lock member 22 includes a shank (FIG. 4) having a main cylindrical portion 23 and a threaded lower end portion 24. A head 26 is formed integrally with the shank and includes an outwardly projecting flange 27. Th table 12 includes a downwardly extending integral ring portion 28 having an outwardly extending circular flange 29 which underlies the flange 27 of the lock member 22. The cylindrical portion 23 of the shank of the lock member is received in an upright bore 31 in the base. The threaded lower end portion 24 of the shank extends into a well 31a in the base 10. A nut 32 is mounted on the threaded portion of the shank and engages a washer 32a (FIG. 4) which underlies the portion of the base surrounding the cylindrical portion 23 of the shank of the lock member 22. A handle 33 is mounted in the nut, and the handle 33 can be swung between the position shown in full lines in FIG. 2 and a position shown in dot-dash lines at 33' in FIG. 2 to draw the flange 27 (FIGS. 1 and 4) of the lock member against the circular flange 29 of the table to lock the table against turning.

Figure 3:
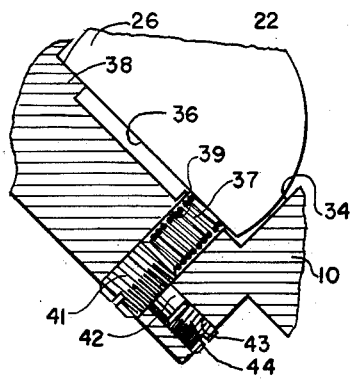
FIG. 3 is an enlarged view in horizontal section showing details of the locking structure.
Figure 4:
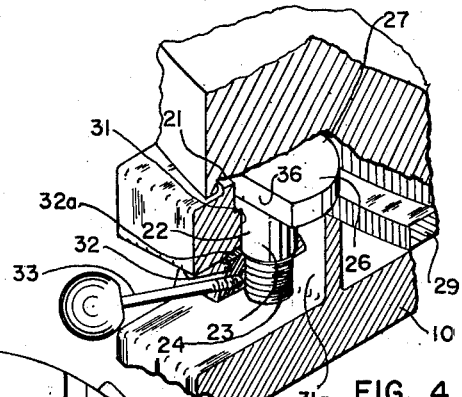
FIG. 4 is a perspective view illustrating details of construction of the locking structure.

The head 26 of the lock member is mounted in a well 34 in the base. As shown in FIGS. 3 and 4, the head includes an outer upright or vertical face 36. A compression spring 37 (FIG. 3) engages an end portion of the face 36 spaced from the center line thereof to urge the lock member 22 in a counterclockwise direction as shown in FIG. 3. An upright lug 38 on the base is engaged by an opposite end portion of the face 36 at the other side of the center line thereof to limit swinging thereof.

The spring 37 is mounted in a horizontal bore 39 in the base. An adjustment screw 41 threaded in the bore 39 engages the spring 37 to adjust the stress therein. A plug 42 mounted in a cross bore 43 is held against the adjustment screw 41 by a set screw 44 to lock the adjustment screw 41 in selected position.

The spring 37 holds the lock member 22 in the position shown in FIG. 3 with the face 36 engaging the lug 38 but permits the lock member to move downwardly as shown in FIG. 1, when the nut 32 is tightened so that the head flange 27 is drawn downwardly against the circular flange 29 without any pivoting or swinging of the locking member, and the table is locked without a tendency to turn the table as the table is being locked.

The locking structure illustrated in the drawing and described above is subject to structural modification without departing from the spirit and scope of the appended claims.

Having described my invention, what I claim as new and desire to secure by Letters Patent is:

1. A rotary work table which comprises a base, a table member rotatably mounted on the base, there being a circular flange on the table, there being a cylindrical opening in the base adjacent the table flange and extending parallel to the axis of rotation of the table member, a lock member having a shank received in said cylindrical opening, and a head at one end of the shank having a head flange overlying the flange of the table, there being a stop portion on the base, there being a stop shoulder on the head engageable with the stop portion of the base to limit swinging of the lock member about its axis, resilient means urging the lock member in a direction to cause the stop shoulder to engage the stop portion of the base, the shank having a threaded portion remote from the head, a nut mounted on the threaded portion of the shank and engageable with the base, and means for turning the nut to draw the head flange of the lock member against the circular flange of the table to lock the table in selected position.

2. A rotary work table which comprises a base, a table member rotatably mounted on the base, there being a circular, outwardly projecting flange on the table, there being a cylindrical opening in the base adjacent and outboard of the table flange and extending parallel to the axis of rotation of the table member, a lock member having a shank received in said cylindrical opening, and a head at one end of the shank having a head flange overlying the flange of the table, there being a face on the head remote from the head flange and parallel to the axis of rotation of the table member, there being a stop portion of the base engageable by said face to limit swinging of the lock member about its axis, resilient means urging the lock member in a direction to cause said face of the head to engage the stop portion of the base, the shank having a threaded portion remote from the head, a nut mounted on the threaded portion of the shank and engageable with the base, and means for turning the nut to draw the head flange of the lock member against the circular flange of the table to lock the table in selected position.

3. A rotary work table which comprises a base, a table member rotatably mounted on the base, there being a circular outwardly projecting flange on the table, there being a cylindrical opening in the base adjacent and outboard of the table flange and extending parallel to the axis of rotation of the table member, a lock member having a shank received in said cylindrical opening, and a head at one end of the shank having a head flange overlying the flange of the table, there being a face on the head remote from the head flange and parallel to the axis of rotation of the table member, there being a stop portion of the base engageable by a portion of said face to limit swinging of the lock member about its axis, a compression spring mounted in the base and engaging another portion of said face to urge the lock member in a direction to cause said face of the head to engage the stop portion of the base, the shank having a threaded portion remote from the head, a nut mounted on the threaded portion of the shank and engageable with the base, and means for turning the nut to draw the head flange of the lock member against the circular flange of the table to lock the table in selected position.

References Cited in the file of this patent

UNITED STATES PATENTS

| | | |
|---|---|---|
| 1,132,320 | Fegley et al. | Mar. 16, 1915 |
| 1,329,602 | Holtberg | Feb. 3, 1920 |
| 1,385,216 | Lidstone | July 19, 1921 |
| 1,463,706 | Ketchum | July 31, 1923 |